March 10, 1936.
C. C. FARMER
2,033,463
FLUID PRESSURE BRAKE
Filed Dec. 9, 1931
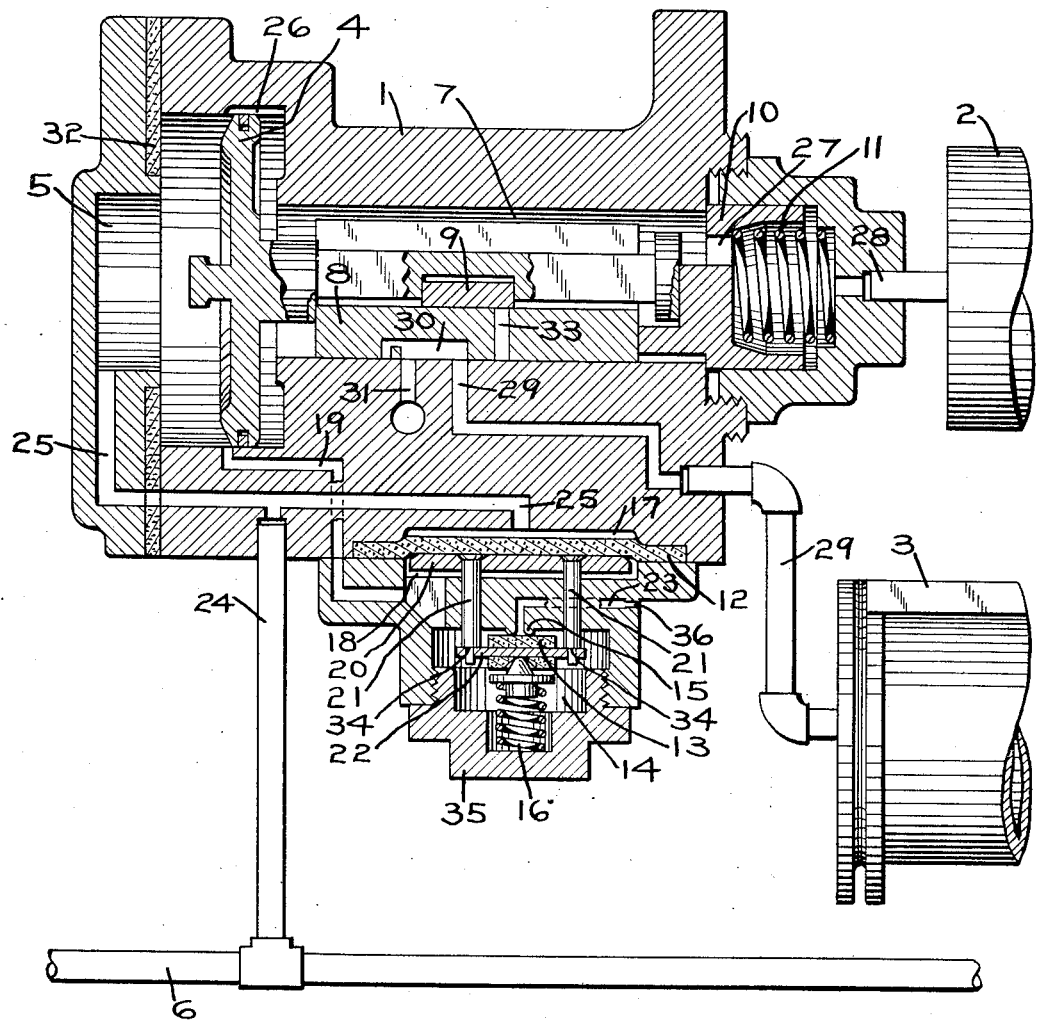
INVENTOR.
CLYDE C. FARMER
By *Wm. M. Cady*
ATTORNEY.

Patented Mar. 10, 1936

2,033,463

UNITED STATES PATENT OFFICE 2,033,463

FLUID PRESSURE BRAKE

Clyde C. Farmer, Pittsburgh, Pa., assignor to The Westinghouse Air Brake Company, Wilmerding, Pa., a corporation of Pennsylvania Application December 9, 1931, Serial No. 579,887

10 Claims. (Cl. 303—68)

This invention relates to fluid pressure brakes and more particularly to a fluid pressure brake equipment adapted to operate upon a reduction in brake pipe pressure to effect an application of the brakes and upon an increase in brake pipe pressure to effect a release of the brakes.

With the usual fluid pressure brake equipment difficulty is at times encountered in obtaining a sufficient increase in brake pipe pressure acting on one side of the triple valve piston over auxiliary reservoir pressure acting on the other side to move the piston and associated valves to release position to effect a release of the brakes. This is particularly true at the rear end of a long train where the rate of increase in brake pipe pressure is relatively slow and leakage past the triple valve piston may charge the auxiliary reservoir from the brake pipe at substantially the same rate as the brake pipe is being charged. Even if the leakage past the piston is tolerable, if the friction of the piston and slide valves is excessive, a failure to move or a delayed movement of the triple valve to release position may result.

The principal object of my invention is to provide improved means for overcoming the above difficulty.

According to my invention, I provide a release ensuring valve device comprising a flexible diaphragm having a chamber at one side at all times in communication with the brake pipe and a chamber at the other side connected by a passage to the triple valve piston chamber and controlled by the triple valve piston in such a manner that when the piston is in release position said passage will be open to brake pipe pressure, but when the piston is in brake application position said passage is open to auxiliary reservoir pressure. According to this construction, when the brake pipe pressure is increased a predetermined small degree above auxiliary reservoir pressure, the release ensuring valve device will operate to vent fluid under pressure from the auxiliary reservoir until the auxiliary reservoir pressure acting on one side of the triple valve piston is reduced sufficiently below brake pipe pressure acting on the other side of said piston to cause said piston to promptly operate and move the associated slide valves to release position. In release position of the triple valve piston, the release ensuring valve device is rendered inoperative to continue the venting of fluid under pressure from the auxiliary reservoir, due to the fact that the above mentioned passage is connected to the brake pipe, and the diaphragm is balanced with brake pipe pressure on both sides.

In the accompanying drawing, the single figure is a diagrammatic view of a fluid pressure brake equipment embodying my invention.

As shown in the drawing, the fluid pressure brake equipment comprises a triple valve device or other brake controlling valve device 1, an auxiliary reservoir 2 and a brake cylinder 3.

The triple valve device 1 comprises a casing containing a piston 4 having at one side a chamber 5 connected to the usual brake pipe 6 and having at the other side a valve chamber 7 connected to the auxiliary reservoir 2 and containing a main slide valve 8 and an auxiliary slide valve 9 adapted to be operated by said piston. The usual retarded release mechanism may be provided in the outer end of valve chamber 7 and comprises a movable abutment 10 and a spring 11 acting on said abutment.

Preferably associated with the triple valve device is a release ensuring valve device comprising a flexible diaphragm 12 and a poppet valve 13 contained in a chamber 14 and adapted to be operated by said diaphragm, said poppet valve being normally pressed into engagement with a seat rib 15 by means of a spring 16.

The flexible diaphragm 12 is preferably mounted between the triple valve casing and the poppet valve casing, as shown in the drawing, and has at one side a chamber 17 open at all times to the brake pipe 6 through passage 25 and at the other side a chamber 18, which, in accordance with one feature of my invention, is adapted to communicate through a passage 19 with the piston chamber 5 at one time and with the valve chamber 7 at another time, in accordance with the position of the triple valve piston 4.

A follower plate 20 is disposed in chamber 18 and is provided with a plurality of operating pins 21, each of which slidably extends through a suitable bore in the release valve casing and into the poppet valve chamber 14 for unseating the poppet valve 13.

The open end of the poppet valve chamber 14 is closed by a removable screw-threaded plug 35 which permits the assembly of the poppet valve 13 in chamber 14.

The poppet valve 13 is preferably made of a rubber composition and molded in said valve is a member 22 of greater diameter, said member being provided with apertures for receiving the ends of the operating pins 21. The end of each of the operating pins is reduced in cross-section so as to form a shoulder 34 and the member 22 is maintained in engagement with the shoulders 34 by means of spring 16.

In operation, to initially charge the brake equipment with fluid under pressure, fluid under pressure is supplied to the brake pipe 6 in the usual manner and from thence flows through pipe 24 and passage 25 to the triple valve piston chamber 5 and to the diaphragm chamber 17.

Assuming the triple valve parts to be in the release position shown in the drawing, fluid under pressure flows from piston chamber 5 through a feed passage or groove 26 to valve chamber 7 and from said valve chamber through a passage 27 in the retarded release abutment 10 and passage and pipe 28 to the auxiliary reservoir 2. Fluid under pressure also flows from piston chamber 5 through passage 19 to diaphragm chamber 18 and poppet valve chamber 14. The diaphragm 12 is thus subject on opposite sides to fluid at the pressure carried in the brake pipe, under which condition the spring 16 maintains the poppet valve 13 seated.

With the main slide valve 8 in the release position shown in the drawing, the brake cylinder 3 is open to the atmosphere through pipe and passage 29, cavity 30 in said slide valve and an atmospheric passage 31.

If it is desired to effect a service application of the brakes, a gradual reduction in brake pipe pressure is effected in the usual manner, and a corresponding reduction occurs in piston chamber 5. When the pressure in chamber 5 is thus reduced a predetermined degree below the auxiliary reservoir pressure in valve chamber 7, the piston 4 is operated to move the slide valves 8 and 9 to application position in which said piston engages a gasket 32.

In application position of the slide valves 8 and 9, a port 33 in the main slide valve 8 is uncovered by the auxiliary slide valve 9 and registers with the brake cylinder passage 29, so that, fluid under pressure is permitted to flow from valve chamber 7 and the connected auxiliary reservoir 2 to the brake cylinder 3 for applying the brakes.

The flow of fluid under pressure from valve chamber 7 to the brake cylinder reduces the pressure in said chamber, and when reduced to slightly below the reduced brake pipe pressure acting in piston chamber 5, the piston 4 and auxiliary slide valve are moved toward the right hand to lap position, in which the port 33 is lapped so as to prevent further flow of fluid under pressure to the brake cylinder.

As the piston 4 moves from release position, shown in the drawing, to application position, passage 19 is disconnected from piston chamber 5 and connected to valve chamber 7, and this communication is maintained upon movement of the piston 4 from application position to lap position, so that when the brakes are applied fluid at auxiliary reservoir pressure in valve chamber 7 equalizes through passage 19 into diaphragm chamber 18 and poppet valve chamber 14 of the release ensuring valve device.

To effect a release of the brakes after an application, fluid under pressure is supplied to the brake pipe 6 and from thence flows through pipe 24 and passage 25 to the triple valve piston chamber 5 and diaphragm chamber 17 of the release ensuring valve device.

The increase in brake pipe pressure in piston chamber 5 above auxiliary reservoir pressure in valve chamber 7 is adapted to move the piston 4 and slide valves 8 and 9 to the release position shown in the drawing. In the release position, the feed passage 26 is opened to the piston chamber 5 so that fluid under pressure is permitted to flow from said piston chamber and the connected brake pipe 6 to valve chamber 7 and from thence to the auxiliary reservoir 2 for charging said reservoir. In release position of the main slide valve 8, fluid under pressure is vented from the brake cylinder 3 through pipe and passage 29, cavity 30 in said slide valve and atmospheric passage 30 to effect a release of the brakes.

If the triple valve device operates as just described to effect a release of the brakes the movement of piston 4 to release position connects passage 19 to piston chamber 5 so that fluid under pressure is then supplied from the brake pipe to diaphragm chamber 18. Chamber 17 being always in communication with the brake pipe, the fluid pressures on the opposite sides of the diaphragm are thus balanced which permits spring 16 to maintain the poppet valve 13 seated.

If, however, the brake pipe pressure in piston chamber 5 does not increase sufficiently above the auxiliary reservoir pressure in valve chamber 7 to promptly move the triple valve piston 4 and slide valves 8 and 9 to release position, then the increase in brake pipe pressure in diaphragm chamber 17 over auxiliary reservoir pressure in diaphragm chamber 18 deflects the diaphragm 12 downwardly and moves valve 13 away from the seat rib 15.

With the poppet valve 13 unseated fluid under pressure is vented from the valve chamber 7 and the connected auxiliary reservoir 2 to the atmosphere by way of passage 19, poppet valve chamber 14, past the unseated valve 13 and through the atmospheric passage 23.

The venting of fluid under pressure from valve chamber 7, as just described, continues until a sufficient difference in pressures is obtained in piston chamber 5 and valve chamber 7 to overcome the resistance to movement of piston 4 and slide valves 8 and 9, at which time said piston moves said slide valves to release position.

The movement of piston 4 to release position connects passage 19 to piston chamber 5 and fluid at brake pipe pressure is supplied to diaphragm chamber 18 and poppet valve chamber 14. Since chamber 17 at the other side of the diaphragm 12 is also supplied with fluid at brake pipe pressure, spring 16 then seats valve 13 so as to prevent venting of fluid under pressure from the brake pipe to the atmosphere.

A choke 36 is provided in passage 23 so as to permit the pressure in chamber 18 to promptly build up equal to the pressure in chamber 17, when the triple valve piston 4 moves to release position, and thereby facilitate prompt movement of the poppet valve 13 to its seat.

As the piston 4 moves to release position, the passage 19 is disconnected from valve chamber 7 at substantially the same time or slightly in advance of the opening of feed groove 26 to piston chamber 5, so as to prevent the possibility of supplying fluid under pressure to valve chamber 7 and the auxiliary reservoir at such a rate as to equal the rate at which fluid is vented from the auxiliary reservoir past the poppet valve 13. Such an undesirable condition would tend to effect a balance of forces on the piston 4 and thus prevent movement of the triple valve device to the release position.

Since the application position of the triple valve parts is defined by engagement of piston 4 with gasket 32, it will be evident that if a sudden or emergency reduction in brake pipe pressure is effected, the triple valve parts will move to the same position as upon a gradual reduction in brake pipe pressure and, also, the release ensuring valve device will operate upon an increase in brake pipe pressure to ensure movement of the triple valve parts to release position in the same manner as after a service application of the brakes.

From the above description of operation, it will now be noted that I have provided an improved valve device which will operate upon a predetermined small increase in pressure in the brake pipe over that in the auxiliary reservoir to vent fluid under pressure from the auxiliary reservoir for ensuring movement of the triple valve device to release position in case the triple valve device does not promptly operate upon an increase in brake pipe pressure less than required to operate the release ensuring valve device. The connection from the auxiliary reservoir to the release ensuring valve device is established only when the triple valve device is in a position in which the brakes are adapted to be applied, and is controlled by the triple valve piston so that when said piston is moved to release position, said connection is closed and the release ensuring valve device is conditioned to prevent further venting of fluid under pressure from the auxiliary reservoir.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, an auxiliary reservoir, and a triple valve device subject to the opposing pressures of the brake pipe and auxiliary reservoir and having a brake application position and a release position, of valve means operative to vent fluid under pressure from the auxiliary reservoir and subject on one side to brake pipe pressure, said valve device being operative in application position to subject the opposite side of said valve means to auxiliary reservoir pressure.

2. In a fluid pressure brake, the combination with a brake pipe, an auxiliary reservoir, and a triple valve device subject to the opposing pressures of the brake pipe and auxiliary reservoir and having a brake application position and a release position, of valve means operative to vent fluid under pressure from the auxiliary reservoir and subject on one side to brake pipe pressure, said valve device being operative in application position to subject the opposite side of said valve means to auxiliary reservoir pressure and in release position to subject said opposite side to brake pipe pressure.

3. In a fluid pressure brake, the combination with a brake pipe, an auxiliary reservoir, and a triple valve device comprising a piston subject to the opposing pressures of the brake pipe and auxiliary reservoir, and valve means operated by said piston for controlling the application and release of the brakes, of a release valve device operative upon an increase in brake pipe pressure for venting fluid under pressure from the auxiliary reservoir, said piston being adapted in application position to open communication through which said release valve device vents fluid from the auxiliary reservoir and in release position to close said communication.

4. In a fluid pressure brake, the combination with a brake pipe and an auxiliary reservoir, of a triple valve device having a feed passage for supplying fluid under pressure from the brake pipe to said auxiliary reservoir and comprising a piston subject to the opposing pressures of the brake pipe and auxiliary reservoir and movable to a release position for opening communication through said feed passage, said piston being movable to an application position upon a reduction in brake pipe pressure to close said communication, a passage controlled by said piston and connected to the auxiliary reservoir when said piston is in application position and disconnected from the auxiliary reservoir ahead of the opening of said communication upon movement of said piston to release position, and valve means operated upon an increase in brake pipe pressure to vent fluid under pressure from the auxiliary reservoir through said passage for effecting movement of said piston to release position.

5. In a fluid pressure brake, the combination with a brake pipe, an auxiliary reservoir, and a triple valve device comprising a piston subject to the opposing pressures of the brake pipe and auxiliary reservoir, and valve means movable by said piston to an application position for effecting an application of the brakes and to a release position for effecting a release of the brakes, of a valve device operative upon an increase in brake pipe pressure to vent fluid under pressure from said auxiliary reservoir for moving said triple valve device to release position, said valve device comprising a vent valve for venting fluid under pressure from the auxiliary reservoir, a movable abutment for operating said vent valve to open the communication through which fluid under pressure is vented from said auxiliary reservoir, and a spring for operating said vent valve to close said communication, said movable abutment having at one side a chamber in constant communication with the brake pipe, and a chamber at the other side connected to the auxiliary reservoir when said triple valve piston is in application position and connected to the brake pipe upon movement of said piston to release position.

6. In a fluid pressure brake, in combination, a brake pipe, an auxiliary reservoir, a brake controlling valve device comprising valve means and a piston operative upon a reduction in brake pipe pressure to actuate said valve means to effect an application of the brakes and operative upon a subsequent increase in brake pipe pressure to actuate said valve means to effect a release of the brakes, said piston in its traverse to application position establishing a communication through which fluid under pressure is adapted to be vented from the auxiliary reservoir, and valve mechanism closing said communication and operative upon an increase in brake pipe pressure in initiating the release of the brakes to open said communication, said piston in its traverse to release position being adapted to cut off the flow of fluid from the auxiliary reservoir by way of said communication.

7. In a fluid pressure brake, in combination, a brake pipe, an auxiliary reservoir, a brake controlling valve device comprising valve means and a piston operative upon a reduction in brake pipe pressure to actuate said valve means to effect an application of the brakes and operative upon a subsequent increase in brake pipe pressure to actuate said valve means to effect a release of the brakes, said piston in its traverse to application position establishing a communication through which fluid under pressure is adapted to be vented from the auxiliary reservoir, and valve mechanism closing said communication and operative upon an increase in brake pipe pressure in initiating the release of the brakes to open said communication, said piston in its traverse to release position first cutting off the auxiliary reservoir venting communication and then establishing a communication through which fluid under pressure is adapted to flow from the brake pipe to said valve mechanism to effect the operation of said valve mechanism to its cut-off position to prevent the venting of fluid from the brake pipe.

8. In a fluid pressure brake, in combination, a brake pipe, an auxiliary reservoir, a brake controlling valve device comprising a piston and valve means operative upon a reduction in brake pipe pressure to a brake application position and operative upon a subsequent increase in brake pipe pressure to a brake releasing position, means for venting fluid under pressure from the auxiliary reservoir in effecting a release of the brakes, adapted to be cut into cooperative relationship with the auxiliary reservoir by said piston in its traverse toward brake application position, said means when cut into said cooperative relationship being operative upon an increase in brake pipe pressure in effecting the release of the brakes to vent fluid under pressure from the auxiliary reservoir to effect a reduction in auxiliary reservoir pressure and thereby facilitate the movement of the brake controlling valve parts toward brake releasing position.

9. In a fluid pressure brake, in combination, a brake pipe, an auxiliary reservoir, a brake controlling valve device comprising a piston and valve means operative upon a reduction in brake pipe pressure to a brake application position and operative upon a subsequent increase in brake pipe pressure to a brake releasing position, means for venting fluid under pressure from the auxiliary reservoir in effecting a release of the brakes, adapted to be cut into cooperative relationship with the auxiliary reservoir by said piston in its traverse toward brake application position, said means when cut into said cooperative relationship being operative upon an increase in brake pipe pressure in effecting the release of the brakes to vent fluid under pressure from the auxiliary reservoir to effect a reduction in auxiliary reservoir pressure and thereby facilitate the movement of the brake controlling valve parts toward brake releasing position, said piston in its traverse toward release position being adapted to cut off the flow of fluid from the auxiliary reservoir.

10. In a fluid pressure brake, in combination, a brake pipe, an auxiliary reservoir, a brake controlling valve device comprising a piston and valve means operative upon a reduction in brake pipe pressure to a brake application position and operative upon a subsequent increase in brake pipe pressure to a brake releasing position, means for venting fluid under pressure from the auxiliary reservoir in effecting a release of the brakes, adapted to be cut into cooperative relationship with the auxiliary reservoir by said piston in its traverse toward brake application position, said means when cut into said cooperative relationship being operative upon an increase in brake pipe pressure in effecting the release of the brakes to vent fluid under pressure from the auxiliary reservoir to effect a reduction in auxiliary reservoir pressure and thereby facilitate the movement of the brake controlling valve parts toward brake releasing position, said piston in its traverse toward release position being adapted to cut said means out of cooperative relationship with the auxiliary reservoir and thereby limit the reduction in auxiliary reservoir pressure.

CLYDE C. FARMER.